United States Patent [19]

Markyvech et al.

[11] Patent Number: 5,508,916

[45] Date of Patent: Apr. 16, 1996

[54] CONTROL FOR ENGAGEMENT OF POSITIVE CLUTCHES IN AUTOMATED MECHANICAL TRANSMISSION SYSTEMS

[75] Inventors: Ronald K. Markyvech, Allen Park; Thomas A. Genise, Dearborn, both of Mich.

[73] Assignee: Eaton Corporation, Cleveland, Ohio

[21] Appl. No.: 387,511

[22] Filed: Feb. 13, 1995

[51] Int. Cl.$^6$ .......................... G06G 7/70; F16H 59/48; B60K 41/22

[52] U.S. Cl. .................. 364/424.1; 364/424.01; 477/80; 477/68; 477/86; 477/75; 477/124; 477/904; 477/78; 477/120; 60/327; 60/468; 60/487; 74/339; 74/357; 74/359; 74/360; 74/335; 74/336 R; 192/3.63; 192/3.55; 192/3.62

[58] Field of Search ............... 364/424.1, 424.01; 477/75, 78, 124, 904, 80, 68, 86, 120, 78; 74/335, 339, 357, 360, 720, 655, 730.1, 337; 192/53 F, 3.63, 3.55, 3.62; 60/327, 468, 487

[56] References Cited

U.S. PATENT DOCUMENTS

| | | | |
|---|---|---|---|
| 4,252,222 | 2/1981 | Morscheck | 192/53 F |
| 4,252,223 | 2/1981 | Morscheck | 192/53 F |
| 4,261,216 | 4/1981 | Braun | 74/339 |
| 4,329,885 | 5/1982 | Morscheck | 74/339 |
| 4,361,060 | 11/1982 | Smyth | 74/337 |
| 4,648,290 | 8/1987 | Dunkley et al. | 477/78 |
| 4,850,236 | 7/1989 | Braun | 74/337 |
| 4,930,078 | 5/1990 | Dunkley et al. | 364/424.1 |
| 4,958,492 | 9/1990 | Maki et al. | 477/68 |
| 5,042,327 | 8/1991 | Stainton | 477/73 |
| 5,335,566 | 8/1994 | Genise et al. | 364/424.1 |
| 5,385,515 | 1/1995 | Chan et al. | 477/75 |
| 5,413,012 | 5/1995 | Davis | 74/335 |
| 5,416,700 | 5/1995 | Bates et al. | 364/424.1 |
| 5,425,284 | 6/1995 | Davis | 74/335 |

*Primary Examiner*—Kevin J. Teska
*Assistant Examiner*—Jacques H. Louis-Jacques
*Attorney, Agent, or Firm*—Howard D. Gordon

[57] ABSTRACT

A control method/system for controlling engagement of a target gear ratio ($GR_T$) in a vehicular automated mechanical transmission system (10) is provided. The control causes engine speed (ES) to be alternately greater than and then less than synchronous engine speed ($ES=IS=OS*GR_T$) to cause torque reversals across the engaging positive jaw clutch associated with the target gear ratio to minimize or prevent partial engagement caused by torque lock conditions.

15 Claims, 5 Drawing Sheets

CONTROL FOR ENGAGEMENT OF POSITIVE CLUTCHES IN AUTOMATED MECHANICAL TRANSMISSION SYSTEMS

BACKGROUND OF THE INVENTION

1. Field of the Invention

This invention relates to fully and partially automated vehicular mechanical transmission systems of the type utilizing controlled engine fueling to cause synchronous conditions for engaging positive clutch members associated with a target gear ratio. In particular, the present invention relates to a control system/method for an at least partially automated mechanical transmission system wherein the requested engine speed during a gear engagement operation is set at a value alternately above and then below, or vice versa, true synchronous engine speed (i.e., $ES=IS=OS*GR_T$) by a preselected amount (the "dither") to assure full penetration of the engaging positive clutch and to minimize synchronous overshoot.

2. Description of the Prior Art

Fully and partially automated mechanical transmission systems intended for vehicular use are well known in the prior art, as may be seen by reference to U.S. Pat. Nos. 4,361,060; 4,648,290; 4,595,986; 4,850,236; 5,053,959; 5,109,721; 5,261,288; 5,315,218 and 5,335,566, the disclosures of which are incorporated herein by reference. In these types of systems, engine fueling/braking control is typically utilized to achieve synchronous conditions for engaging a target gear ratio.

The prior art automated transmission systems typically utilized electric, electro-mechanical, electro-hydraulic or electro-pneumatic type actuators to operate a plurality of generally parallel shift rails or a single shift shaft mechanism, or the like, through an X-Y mechanism and/or a plurality of linear actuators. Axially movable jaw clutch members are selectively axially positioned by shift yokes (also called shift forks) carried by shift shafts or block mechanisms, which are axially positioned by shift fingers, pistons and the like. Shift mechanisms of this type may be seen by reference to U.S. Pat. Nos. 4,445,393; 4,873,881; 4,899,607; 4,920,815; RE 34,260; 4,945,484; 5,000,060; 5,052,535; 4,964,313 and 5,368,145, the disclosures of which are incorporated herein by reference.

The prior art control methods/systems were not totally satisfactory, especially for relatively non-compliant electric motor-operated shifters, as during the synchronization and jaw clutch engagement phase of a shift into a target gear ratio, the engaging positive jaw clutch members could become torque locked in an only partially engaged condition. If this condition is allowed to exist for a prolonged period of time, excessive wear and/or damage to the jaw clutch and/or the shift actuator mechanism may result.

SUMMARY OF THE INVENTION

In accordance with the present invention, the drawbacks of the prior art have been overcome or minimized by the provision of a control system/method for fully or partially automated mechanical transmission systems which, during the synchronization and jaw clutch engagement phase of a shift into a target gear ratio, will cause the engine speed alternately to be slightly greater than and then slightly less than, or vice versa, true synchronous engine speed, while continuously urging the engaging jaw clutch into engagement, which will create multiple instances of zero torque transfer conditions at the jaw clutch, allowing full engagement thereof. This procedure will be repeated a given number of times, preferably two or three cycles, or if position sensors indicate full engagement, until full engagement is sensed, whichever is first to occur. Preferably, the amount of engine speed over or under true synchronous (or the "dither") will be about 15–50 RPM for a typical diesel engine in a heavy-duty truck.

Accordingly, it is an object of the present invention to provide a new and improved control method/system for at least partially automated mechanical transmission systems, which assures full engagement of engaging jaw clutch members associated with a target gear ratio.

This and other objects and advantages of the present invention will become apparent from a reading of the detailed description of the preferred embodiment taken in connection with the attached drawings.

DESCRIPTION OF THE PREFERRED EMBODIMENT

Figure 1:
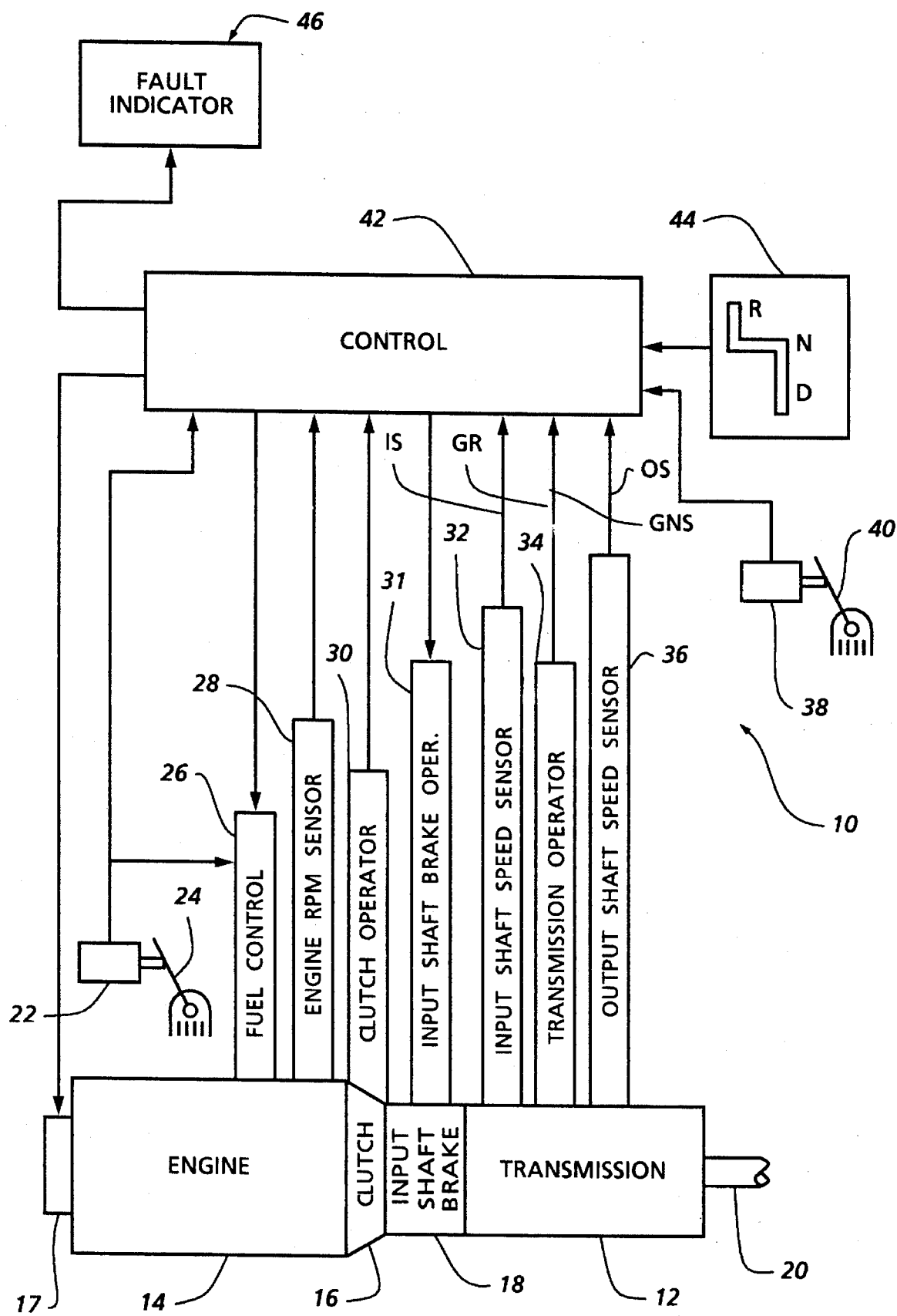
FIG. 1 is a schematic illustration of one example of an automated mechanical transmission system advantageously utilizing the neutral verification control system/method of the present invention.

FIG. 1 schematically illustrates an automatic mechanical transmission system 10 including an automatic multiple-speed change-gear transmission 12 driven by a throttle-controlled engine 14, such as a well-known diesel engine, through a master clutch 16. An engine brake, such as an exhaust brake 17 for retarding the rotational speed of engine 14 and/or an output shaft brake 18 which is effective to apply a retarding force to the input shaft of the transmission upon disengagement of the master clutch 16, may be provided, as is also well known in the prior art. The output of automatic transmission 12 is output shaft 20, which is adapted for driving connection with an appropriate vehicle component, such as the differential of a drive axle, a transfer case or the like.

The aforementioned powertrain components are acted upon and/or monitored by several devices, each of which will be discussed in greater detail below. These devices typically include a throttle position or throttle opening monitor assembly 22, which senses the position of the operator-controlled vehicle throttle and/or other fuel throttling device 24, a fuel-control device 26 for controlling the amount of fuel to be supplied to engine 14, an engine speed sensor 28 which senses the rotational speed of the engine, a master clutch operator 30 which engages and disengages master clutch 16 and which also supplies information as to the status of the master clutch, an input brake operator 31, a transmission input shaft speed sensor 32, a transmission operator 34 which is effective to shift the transmission 12 into a selected gear ratio and to provide a signal or signals indicative of the gear neutral condition and/or currently engaged ratio, and a transmission output shaft speed sensor 36. A vehicle brake monitor 38 senses actuation of the vehicle brake pedal 40.

A transmission operator for an automated mechanical transmission system, including a gear-neutral and gear-engaged switch, may be seen by reference to aforementioned U.S. Pat. Nos. 4,945,484 and 4,445,393, the disclosures of which are incorporated herein by reference. Alternatively, a linear position sensor, such as a linear potentiometer or the like, may be utilized.

The aforementioned devices supply information to and/or accept commands from a central processing unit or control 42. The central processing unit 42 may include analog and/or digital electronic calculation and logic circuitry, the specific configuration and structure of which forms no part of the present invention. Central processing unit 42 may be of the type illustrated in aforementioned U.S. Pat. No. 4,595,986. The central processing unit 42 also receives information from a shift control assembly 44 by which the vehicle operator may select a reverse (R), neutral (N) or forward drive (D) mode of operation of the vehicle. An electrical power source (not shown) and/or a source of pressurized fluid (not shown) provides electrical, hydraulic and/or pneumatic power to the various sensing, operating and/or processing units. A fault indicator or alarm 46 may display the identity of a specific fault or simply the existence of an unidentified fault.

Sensors 22, 28, 32, 36, 38 and 44 may be of any known type or construction for generating analog or digital signals proportional to the parameter monitored thereby. Similarly, operators 17, 18, 26, 30 and 34 may be of any known electrical, pneumatic, hydraulic or electro-pneumatic or -hydraulic type for executing operations in response to command output signals from processing unit 42 and/or for providing input signals thereto. Fuel control 26 normally will supply fuel to engine 14 in accordance with the operator's setting of throttle 24, but may supply a lesser (fuel dip) or greater (fuel boost) amount of fuel in accordance with commands from control unit 42. Fuel control 26 may include an electronically controlled engine, including an engine control microprocessor, and an electronic data link of the type conforming to ISO 11898, SAE J1922 and/or SAE J1939 or similar protocols.

Figure 2:
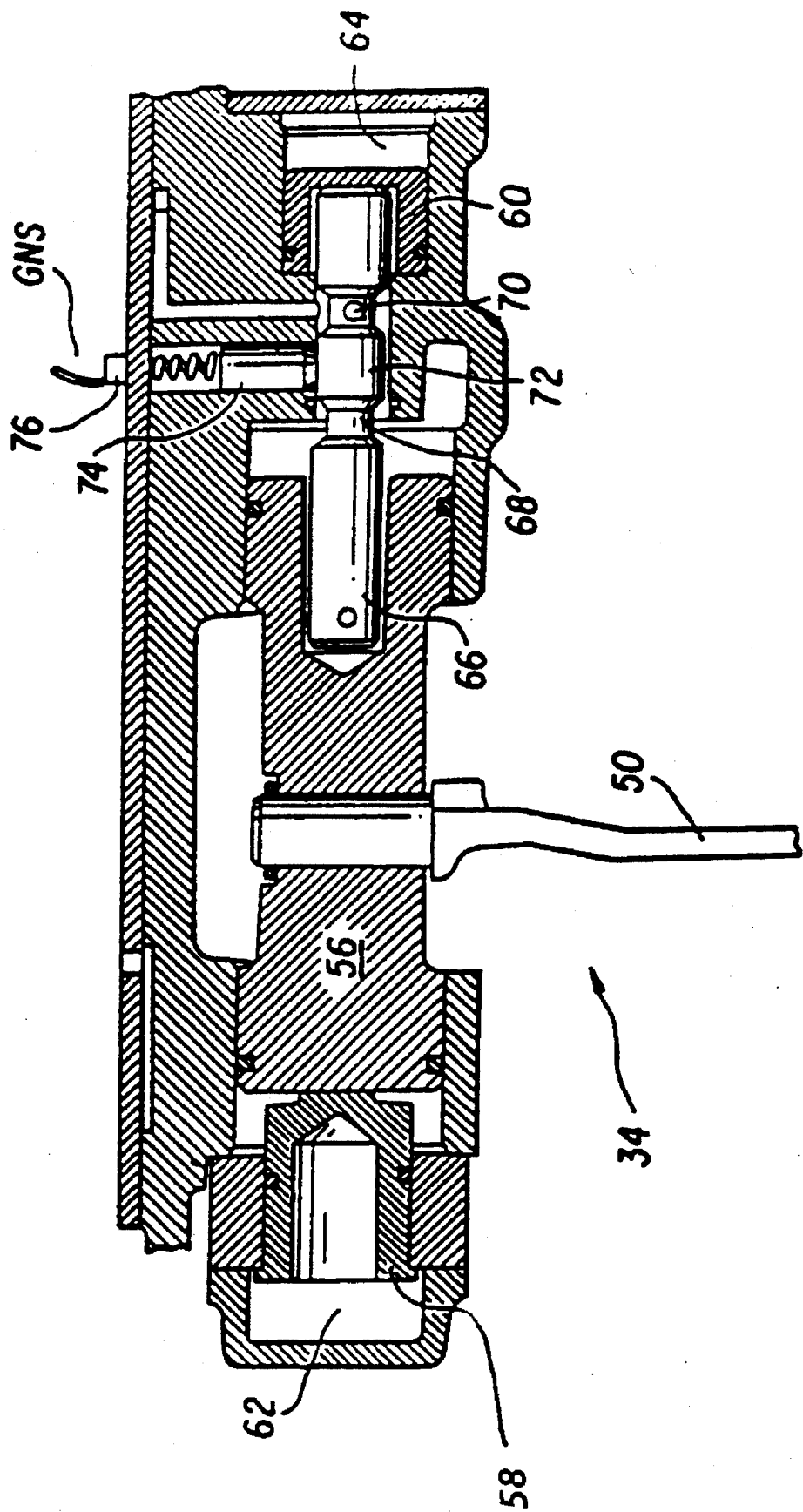
FIG. 2 is a partial sectional view of one example of a transmission actuator, including a gear neutral sensor switch.

A portion of a typical transmission operator 34, for purposes of example only, may be seen by reference to FIG. 2. Briefly, a shift fork 50 is carried by a shift rail 56 for axial movement therewith. A pair of opposed fluid-actuated pistons, 58 and 60, are slidably and sealingly received in selectively pressurized cylinders, 62 and 64, respectively. A shift rod member 66 is axially movable with shift rod 56 and shift fork 50 and defines a pair of grooves, 68 and 70, which are separated by a land 72. A spring-biased plunger 74 cooperates with the land 72 to open gear neutral switch 76 and with grooves 68 and 70 to close gear neutral switch 76. The gear neutral switch 76, thus, provides a gear neutral signal (GNS) having a first value (GNS=0) to indicate a gear neutral condition and a second value (GNS=1) to indicate a gear-engaged condition. Alternatively, if a linear position sensor is utilized, neutral and not-neutral will be associated with ranges of shaft position.

The gear neutral sensor input signal (GNS) is utilized by the central processing unit 42 to control shifting of the automated mechanical transmission 12. For example, during a shift sequence, when the transmission is being shifted from a previously engaged ratio into a target gear ratio ($GR_T$), if the gear neutral signal indicates a gear neutral condition exists, the synchronization procedure for engaging the target gear ratio may proceed.

Figure 3:
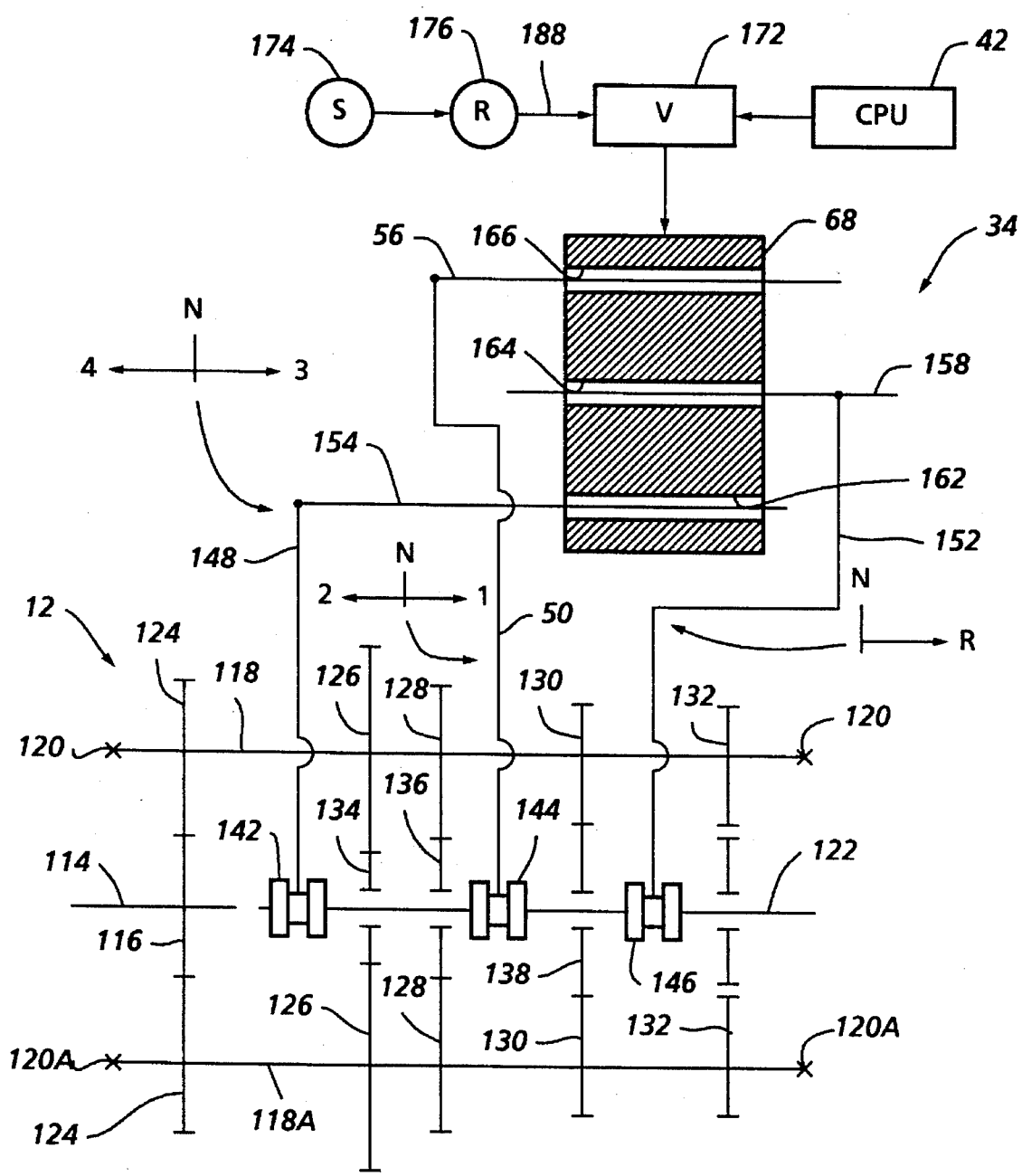
FIG. 3 is a schematic illustration of one example of a simple mechanical change-gear transmission, or a main section of a compound mechanical change-gear transmission, of the type controlled by the present invention.

A typical 4-forward-speed, single-reverse-speed, change-gear mechanical transmission or transmission section 12 for use with system 10 is schematically illustrated in FIG. 3. Transmission 12 is a simple transmission, or transmission section, of the twin countershaft type, which is well known in the prior art, and which may be understood in greater detail by reference to U.S. Pat. Nos. 3,105,395; 4,735,109 and 4,152,949, the disclosures of which are incorporated herein by reference.

The illustrated transmission comprises an input shaft 114 carrying an input gear 116 for rotation therewith. Input shaft 114 is intended to be driven by prime mover 14 through a master friction clutch or torque converter, as is well known in the art. A pair of substantially identical countershafts, 118 and 118A, are rotatably mounted in a housing (not shown) by means of bearings, 120 and 120A. A main or output shaft 22 is provided, which is preferably floatingly and/or pivotably mounted in the transmission housing.

Each of the countershafts 120 and 120A carries countershaft gears 124, 126, 128, 130 and 132 fixed thereto for rotation therewith. Countershaft gear 124 is constantly meshed with input gear 116. A third-speed mainshaft gear 134 surrounds mainshaft 122 and is constantly meshed with and supported by the countershaft gears 126. Second-speed mainshaft gear 136 surrounds mainshaft 122 and is constantly meshed with and supported by countershaft gears 128. First-speed mainshaft gear 138 surrounds mainshaft 122 and is constantly meshed with and supported by countershaft gears 130. The reverse mainshaft gear 140 surrounds mainshaft 122 and is constantly meshed with and supported by a pair of idler gears (not shown) which, in turn, are constantly meshed with and driven by countershaft gears 132.

Axially slidable clutches 142, 144 and 146 are mounted, preferably by a spline connection, to mainshaft 122 for sliding movement relative thereto and for rotation therewith. A shift fork or yoke 148 is received in a groove in clutch 142 for controlling the axial position of clutch 142 relative to mainshaft 122. A shift fork 50 is received in a groove in clutch 144 for axially controlling the position of clutch 144 relative to mainshaft 122. A shift fork 152 is received in an axial groove in clutch 146 for controlling the axial position of clutch 146 relative to mainshaft 122.

The transmission actuator 34 includes three axially movable shift bars, also called shift rails or shift rods, 154, 156 and 158, which are substantially parallel and independently axially slidable in substantially parallel bores 162, 164 and 166, respectively, in a shift bar housing 34A. Shift bar housing 34A is typically mountable to the transmission housing (not shown) in a conventional manner. Shift fork 148 is axially movable with shift bar 154, shift fork 50 is axially movable with shift bar 56, and shift fork 152 is axially movable with shift bar 158. Of course, various other types of shift actuators may be utilized, such as X-Y shift mechanisms as disclosed in aforementioned U.S. Pat. Nos. 4,873,881; 4,899,607 and/or RE 34,260 and/or single shaft-type shifting mechanisms as disclosed in aforementioned U.S. Pat. No. 4,920,815.

Central processing unit 42 will provide control signals indicative of the desired target gear ratio to a valve assembly 172, which will typically comprise a plurality of individually controllable valves, such as solenoid valves or the like. Valve assembly 172 is fluidly connected to a source of pressurized fluid, such as hydraulic fluid or compressed air, from a source 174, which is preferably regulated by a regulator valve 176.

Transmission 12 is illustrated as utilizing positive, non-synchronized jaw clutches. As only one of the clutches should be engaged at any one time to avoid damage to the transmission, shift bar housing assembly 34 will typically include an interlock mechanism (not shown) to prevent movement of more than one of the shift bars 154, 156 and 158 from the neutral axial positions thereof at a given time.

As is well known in automated mechanical transmission systems, to engage a target gear ratio (GRT), the transmission is shifted into neutral and, with the master clutch engaged, the engine (and, thus, the input shaft) are caused to rotate at the synchronous engine speed. The synchronous engine/input shaft speed may be expressed by the expression:

$$ES_{SYNCH} = IS = OS \times GR_T$$

where $ES_{SYNCH}$=synchronous engine speed;

IS=input shaft speed (engine speed with master clutch fully engaged);

OS=output shaft speed; and $GR_T$=numerical value of target gear ratio.

Usually, the shift actuator 34 is commanded to initiate a jaw clutch engagement in advance of engine speed equaling the synchronous speed as a function of the difference between current and synchronous engine speed, the rate of change in engine speed and/or shift actuator response time.

For shift actuators of all types, especially relatively non-compliant shift actuators, such as actuators operated by electric motors, the engaging positive jaw clutch members could become torque locked in an only partially engaged condition. If this partially engaged condition is not corrected, excessive wear and/or damage to the partially engaged jaw clutch members and/or to the actuator mechanism may occur.

Figure 4:
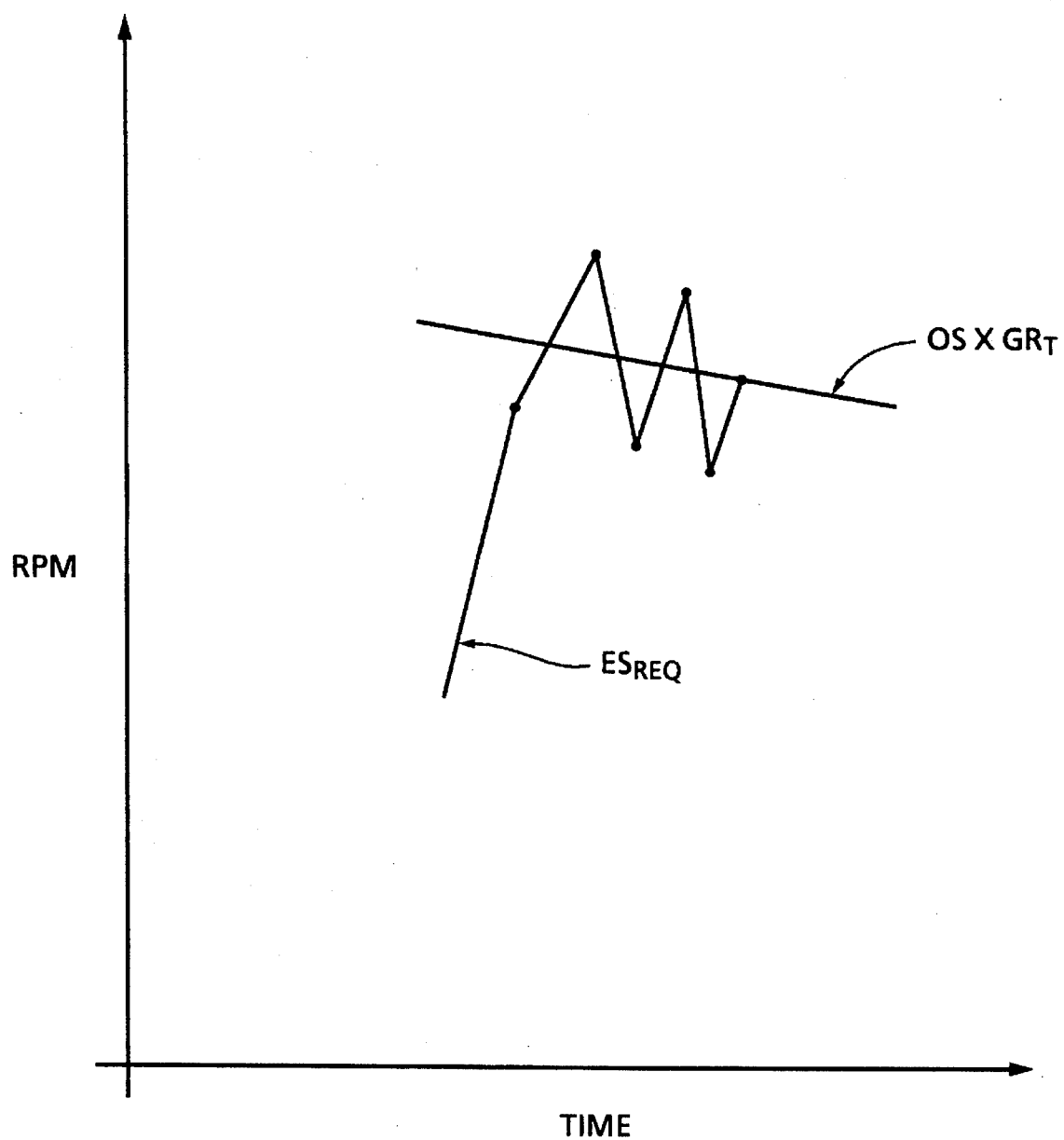
FIG. 4 is graphical representation of the control system/method of the present invention.
Figure 5:
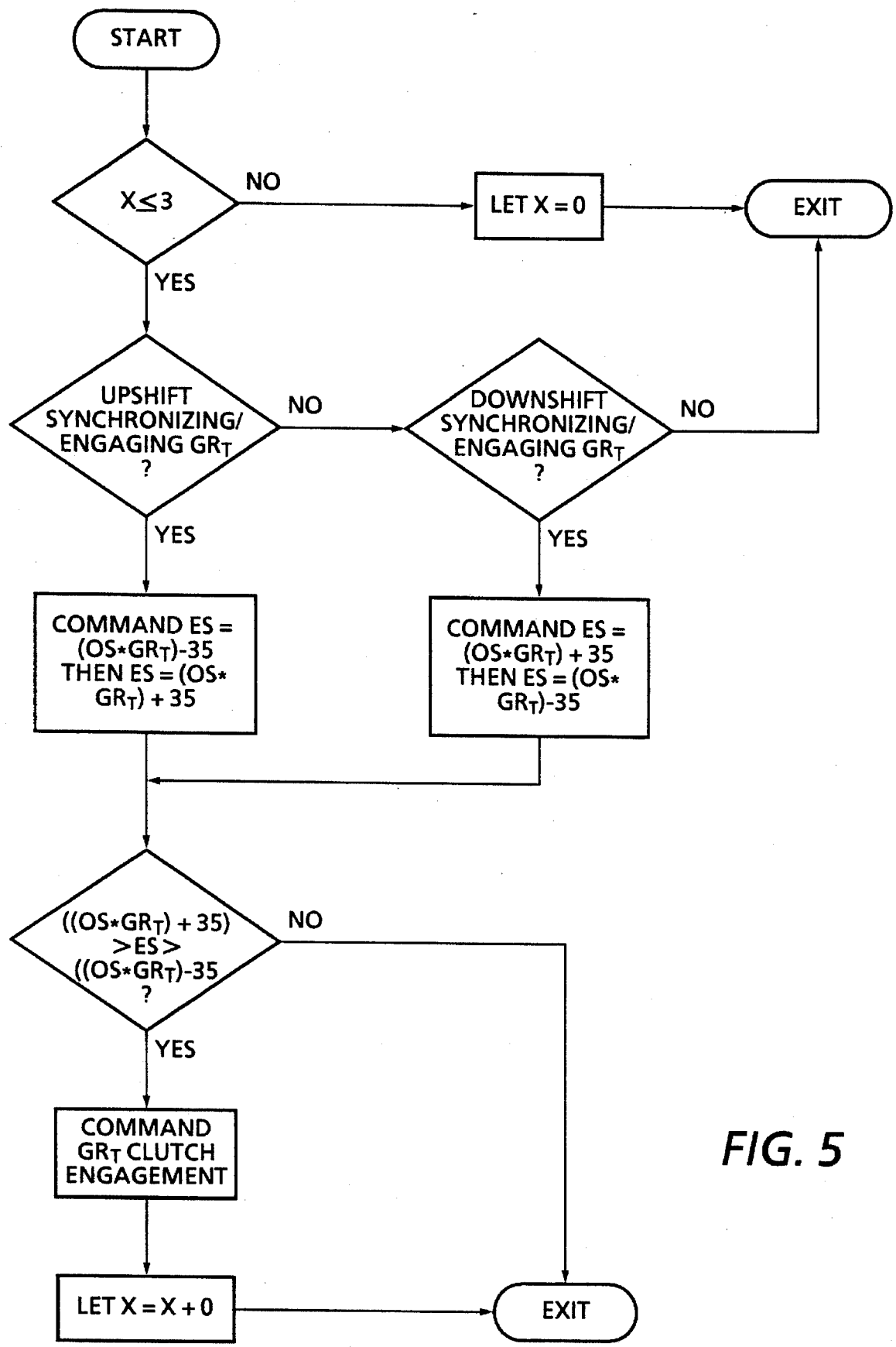
FIG. 5 is a schematic illustration, in flow chart format, of the control system/method of the present invention.

The shift control system/method of the present invention, as may be seen by reference to FIGS. 4 and 5, is provided to minimize or prevent the occurrence of torque locked, partially engaged jaw clutches.

Upon disengaging the previously engaged ratio and engaging the master clutch 16 in preparation for engaging a selected target gear ratio ($GR_T$), the engine is commanded to achieve an engine speed either a little lower (for downshifts) or a little higher (for upshifts) than true synchronous speed (ES=IS=OS*$GR_T$). This will prevent occurrences of overshooting the synchronous speed. Thereafter, while the shift actuators are caused to urge the jaw clutch members associated with the target ratio into positive engagement, the engine is commanded to a speed alterately a little higher than and then a little lower than the current true synchronous speed. Preferably, the amount by which the target engine speed differs from true synchronous engine speed, the "dither," is about 15–50 RPM. By causing the engine speed to be alternately greater than and then less than the synchronous speed, the engaging jaw clutch members will alternate between being driving and driven, and the jaw clutch will pass through a zero torque transfer condition to relieve possible torque locks.

Experimentation has indicated that two or three cycles of causing a torque reversal across the engaging jaw clutch is sufficient to assure that the jaw clutch will not be torque locked into a partially engaged condition. Alternatively, cycling of the engine speeds may be controlled, at least in part, as a function of position sensors indicating partial or full jaw clutch engagement.

Although the present invention has been set forth with a certain degree of particularity, it is understood that various modifications are possible without departing from the spirit and the scope of the invention as hereinafter claimed.

We claim:

1. A method for controlling engagement of a target gear ratio ($GR_T$) in a vehicular automated mechanical transmission system (10) having a fuel-controlled engine (14), a mechanical multiple-speed transmission (12) having a plurality of selectively engageable gear ratios between an input shaft (114) drivingly connected to said engine by a non-positive coupling (16) and an output shaft (20), an information processing unit for receiving a plurality of input signals including input signals indicative of engine rotational speed (ES), output shaft rotational speed (OS) and target gear ratio and for processing same according to predetermined logic rules to issue command output signals to system actuators including an engine controller (26) for controlling the speed of the engine and a transmission operator (34) for shifting the transmission, a gear ratio change of said transmission system comprising the sequence of disengaging a first positive clutch and then engaging a second positive clutch, both of said positive clutches comprising a first clutch member having a rotational speed dependent on the rotational speed of the vehicle engine and a second clutch member having a rotational speed dependent on output shaft speed; said method comprising:

(1) after disengagement of said first positive clutch, commanding said engine to an initial engagement engine speed within predetermined values of synchronous engine speed for engaging said second positive clutch $(((OS*GR_T)+REF_1)>ES>((OS*GR_T)-REF_2)))$; then (2) when current engine speed is within said predetermined values of synchronous engine speed for engaging said second positive clutch, causing said first and second clutch members of said second positive clutch to be continuously urged into engagement while alternatively sensing a first output shaft speed ($OS_1$) and causing said engine to rotate at an engine speed greater by a reference speed than the synchronous speed for engaging said second positive clutch at said first output shaft speed (ES=(($OS_1 \times GR_T$)+REF)) and then sensing a second output shaft speed ($OS_2$) and causing said engine to rotate at an engine speed less by a reference speed than the synchronous speed for engaging said second positive clutch at said second output shaft speed (ES=(($OS_2*GR_T$)−REF))).

2. The method of claim 1 wherein, if engaging said target ratio is an upshift, said initial engagement engine speed is slightly greater than synchronous engine speed for engaging said second positive clutch.

3. The method of claim 2 wherein, if engaging said target ratio is a downshift, said initial engagement engine speed is slightly less than synchronous engine speed for engaging said second positive clutch.

4. The method of claim 1 wherein, if engaging said target ratio is a downshift, said initial engagement engine speed is slightly less than synchronous engine speed for engaging said second positive clutch.

5. The method of claim 1 wherein said non-positive coupling is a selectively engaged and disengaged master friction clutch.

6. The method of claim 1 wherein said predetermined values all are within the range of 15–50 RPM.

7. A control system for controlling engagement of a target gear ratio ($GR_T$) in a vehicular automated mechanical transmission system (10) having a fuel-controlled engine (14), a mechanical multiple-speed transmission (12) having a plurality of selectively engageable gear ratios between an input shaft (114) drivingly connected to said engine by a non-positive coupling (16) and an output shaft (20), an information processing unit for receiving a plurality of input signals including input signals indicative of engine rotational speed (ES), output shaft rotational speed (OS) and target gear ratio and for processing same according to predetermined logic rules to issue command output signals to system actuators including an engine controller (26) for controlling the speed of the engine and a transmission operator (34) for shifting the transmission, a gear ratio change of said transmission system comprising the sequence of disengaging a first positive clutch and then engaging a second positive clutch, both of said positive clutches comprising a first clutch member having a rotational speed dependent on the rotational speed of the vehicle engine and a second clutch member having a rotational speed dependent on output shaft speed; said control system comprising by:

(1) means effective, after disengagement of said first positive clutch, for commanding said engine to an initial engagement engine speed within predetermined values of synchronous engine speed for engaging said second positive clutch $(((OS*GR_T)+REF_1)>ES>((OS*GR_T)-REF_2)))$; and (2) means effective, when current engine speed is within said predetermined values of synchronous engine speed for engaging said second positive clutch, for causing said first and second clutch members of said second positive clutch to be continuously urged into engagement while alternatively sensing a first output shaft speed ($OS_1$) and causing said engine to rotate at an engine speed greater by a reference speed than the synchronous speed for engaging said second positive clutch at said first output shaft speed ($ES=((OS_1 \times GR_T)+REF)$) and then sensing a second output shaft speed ($OS_2$) and causing said engine to rotate at an engine speed less by a reference speed than the synchronous speed for engaging said second positive clutch at said second output shaft speed ($ES=((OS_2*GR_T)-REF))$).

8. The system of claim 7 wherein, if engaging said target ratio is an upshift, said initial engagement engine speed is slightly greater than synchronous engine speed for engaging said second positive clutch.

9. The system of claim 8 wherein, if engaging said target ratio is a downshift, said initial engagement engine speed is slightly less than synchronous engine speed for engaging said second positive clutch.

10. The system of claim 7 wherein, if engaging said target ratio is a downshift, said initial engagement engine speed is slightly less than synchronous engine speed for engaging said second positive clutch.

11. The system of claim 7 wherein said non-positive coupling is a selectively engaged and disengaged master friction clutch.

12. The system of claim 7 wherein said predetermined values all are within the range of 15–50 RPM.

13. An information processing machine (42) for controlling engagement of a target gear ratio (GRT) in a vehicular automated mechanical transmission system (10) having a fuel-controlled engine (14), a mechanical multiple-speed transmission (12) having a plurality of selectively engageable gear ratios between an input shaft (114) drivingly connected to said engine by a non-positive coupling (16) and an output shaft (20), said information processing machine receiving a plurality of input signals including input signals indicative of engine rotational speed (ES), output shaft rotational speed (OS) and target gear ratio and processing same according to predetermined logic rules to issue command output signals to system actuators including an engine controller (26) for controlling the speed of the engine and a transmission operator (34) for shifting the transmission, a gear ratio change of said transmission system comprising the sequence of disengaging a first positive clutch and then engaging a second positive clutch, both of said positive clutches comprising a first clutch member having a rotational speed dependent on the rotational speed of the vehicle engine and a second clutch member having a rotational speed dependent on output shaft speed; said machine comprising logic rules effective:

(1) after disengagement of said first positive clutch, for commanding said engine to an initial engagement engine speed within predetermined values of synchronous engine speed for engaging said second positive clutch $(((OS*GR_T)+REF_1)>ES>((OS*GR_T)-REF_2)))$; then (2) when current engine speed is within said predetermined values of synchronous engine speed for engaging said second positive clutch, for causing said first and second clutch members of said second positive clutch to be continuously urged into engagement while alternatively sensing a first output shaft speed ($OS_1$) and causing said engine to rotate at an engine speed greater by a reference speed than the synchronous speed for engaging said second positive clutch at said first output shaft speed ($ES=((OS_1 \times GR_T)+REF))$ and then sensing a second output shaft speed ($OS_2$) and causing said engine to rotate at an engine speed less by a reference speed than the synchronous speed for engaging said second positive clutch at said second output shaft speed ($ES=((OS_2*GR_T)-REF))$).

14. The machine of claim 13 wherein, if engaging said target ratio is an upshift, said initial engagement engine speed is slightly greater than synchronous engine speed for engaging said second positive clutch.

15. The machine of claim 13 wherein, if engaging said target ratio is a downshift, said initial engagement engine speed is slightly less than synchronous engine speed for engaging said second positive clutch.

\* \* \* \* \*